United States Patent
Salomon et al.

(10) Patent No.: US 11,437,638 B2
(45) Date of Patent: Sep. 6, 2022

(54) PROCESS FOR MANUFACTURING AN ELECTROCHEMICAL-REACTOR FLOW GUIDE

(71) Applicant: Commissariat A L'Energie Atomique et aux Energies Alternatives, Paris (FR)

(72) Inventors: Jeremie Salomon, Grenoble (FR); Benjamin Amestoy, Grenoble (FR); Jean-Francois Blachot, Grenoble (FR); Denis Tremblay, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 336 days.

(21) Appl. No.: 16/567,108

(22) Filed: Sep. 11, 2019

(65) Prior Publication Data
US 2020/0083551 A1    Mar. 12, 2020

(30) Foreign Application Priority Data
Sep. 12, 2018  (FR) ...................... 18 71024

(51) Int. Cl.
| | |
|---|---|
| *H01M 8/0656* | (2016.01) |
| *H01M 8/0267* | (2016.01) |
| *H01M 8/1067* | (2016.01) |
| *H01M 8/1069* | (2016.01) |
| *H01M 8/00* | (2016.01) |

(52) U.S. Cl.
CPC ....... *H01M 8/0656* (2013.01); *H01M 8/0267* (2013.01); *H01M 8/1067* (2013.01); *H01M 8/1069* (2013.01); *H01M 8/002* (2013.01)

(58) Field of Classification Search
CPC . H01M 8/0267; H01M 8/1067; H01M 8/1069
See application file for complete search history.

(56) References Cited

U.S. PATENT DOCUMENTS

| | | |
|---|---|---|
| 2003/0198860 A1 | 10/2003 | Yasumoto et al. |
| 2008/0085440 A1 | 4/2008 | Yasumoto et al. |
| 2018/0190998 A1 | 7/2018 | Maeda et al. |

FOREIGN PATENT DOCUMENTS

CN          107394228 A        11/2017

OTHER PUBLICATIONS

French Preliminary Search Report dated May 27, 2019 in French Application 18 71024, filed on Sep. 12, 2018 (with English Translation of Categories of Cited Documents & Written Opinion).

*Primary Examiner* — James Lee
(74) *Attorney, Agent, or Firm* — Oblon, McClelland, Maier & Neustadt, L.L.P.

(57) ABSTRACT

A process for manufacturing a flow guide for an electrochemical reactor, including providing a substrate; on a first face of the substrate, printing a layer of electrically conductive ink by applying a shear stress to this layer, the viscosity of the printed ink being comprised between 70 and 500 Pa·s for a shear rate of 0.1 s$^{-1}$, and the viscosity of the printed ink being comprised between 2.5 and 7 Pa·s for a shear rate of 100 s$^1$, the layer of ink being printed to form a pattern including ribs delineating flow channels.

22 Claims, 6 Drawing Sheets

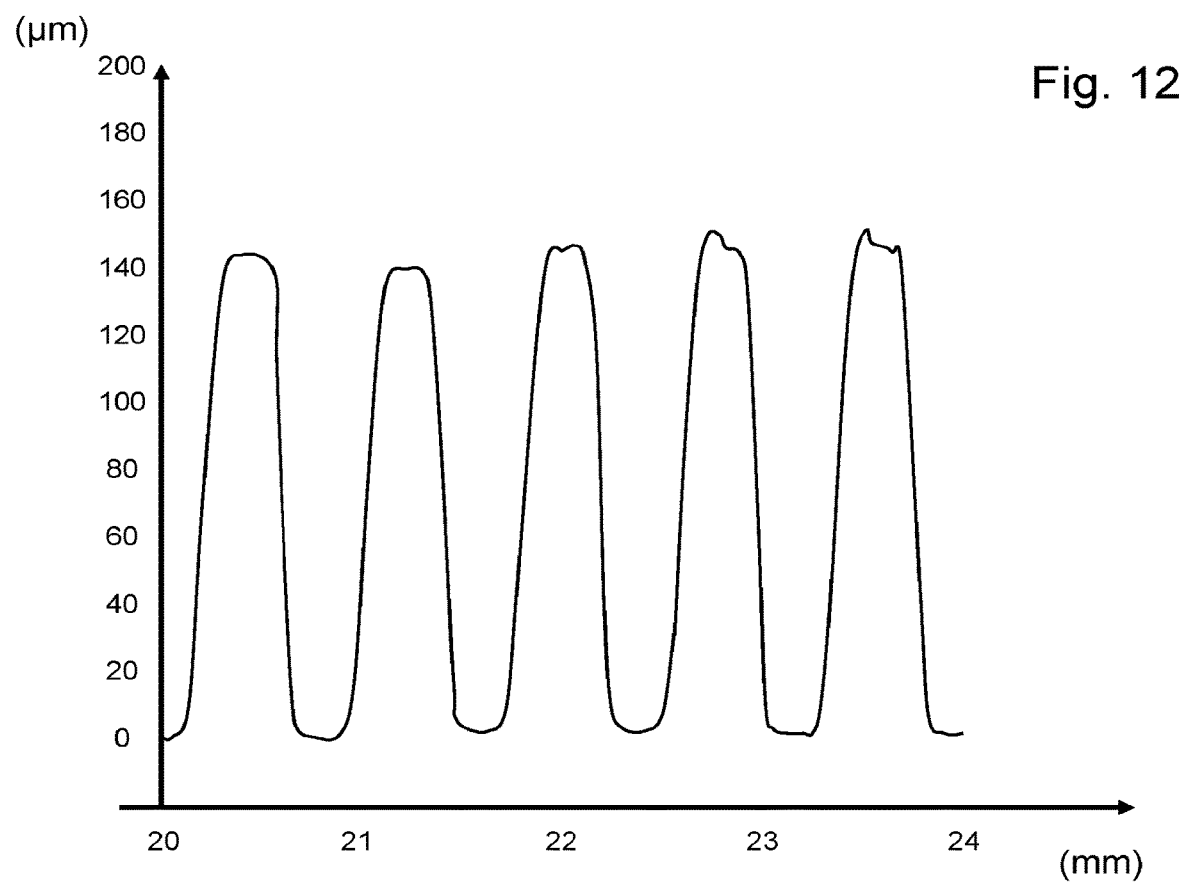
Fig. 12
Fig. 13
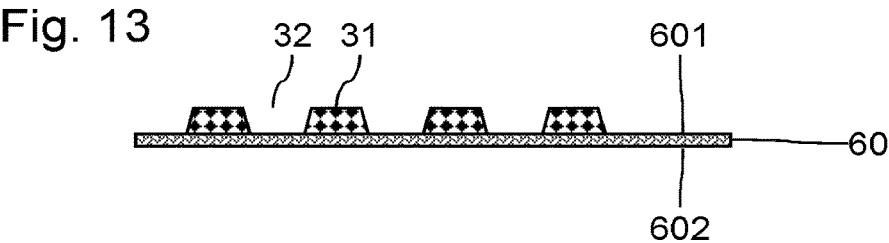
Fig. 14
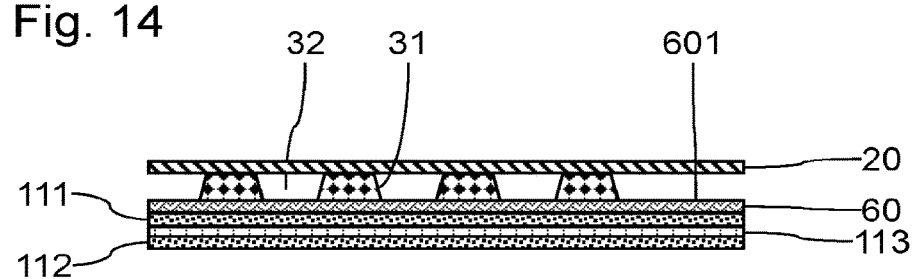

PROCESS FOR MANUFACTURING AN ELECTROCHEMICAL-REACTOR FLOW GUIDE

The invention relates to electrochemical reactors comprising membrane-electrode assemblies, such as proton-exchange-membrane fuel-cells. The invention in particular relates to optimization of the manufacturing process of components of a 10 fuel-cell and to decreasing the weight of these components.

It is for example envisioned to use fuel-cells as sources of electrical power in future mass-produced motor vehicles, and in many other applications. A fuel-cell stack is an electrochemical device that converts chemical energy directly into electrical energy. A combustible such as dihydrogen or methanol is used as fuel in the fuel-cell stack.

In the case of dihydrogen, the latter is oxidized and ionized on one electrode of the stack and an oxidant is reduced on another electrode of the stack. The chemical reaction produces water at the cathode, oxygen being reduced and reacting with the protons. The great advantage of fuel-cell stacks is to avoid the emission of atmospheric pollutants at the site of electricity generation.

Proton-exchange-membrane (PEM) fuel-cell stacks work at low temperatures, typically below 250° C. and have particularly advantageous compactness properties. Each cell comprises an electrolytic membrane that allows only the passage of protons and not the passage of electrons. The membrane comprises an anode on a first face and a cathode on a second face, in order to form a membrane-electrode assembly (MEA).

At the anode, dihydrogen is ionized in order to produce protons that pass through the membrane. The electrons produced by this reaction migrate toward an electronically conductive anode plate, then pass through an electric circuit external to the cell in order to form an electrical current. At the cathode, oxygen is reduced and reacts with the protons to form water and close the electrical circuit with the other so-called cathode plate.

Each electrode must be continuously supplied with reagents in as uniform a manner as possible. To this end, flow channels are conventionally present on the anode and cathode plates. In addition, electronically conductive porous materials are usually placed between the flow channels of the plates and each of the electrodes in order to produce a gas diffusion layer (GDL), typically formed by a network of carbon fibres.

In order to increase the voltage generated by the fuel-cell stack, the latter generally includes a plurality of stacked electrochemical cells that are electrically connected in series. The fuel-cell stack may then comprise a plurality of plates (which may for example be made of metal) equipped with flow channels and stacked on top of one another. The membrane is placed between at least one anode plate and at least one cathode plate. The flow plates may comprise flow orifices and channels in order to guide reagents and products to/from the membrane, in order to guide coolant depending on the power of the fuel-cell stack, and in order to separate various compartments.

The plates equipped with flow channels continuously supply the reactive surfaces of the electrodes with reagents, as they are consumed. The plates comprise networks of flow channels ensuring the distribution of reagents to the reactive zones. The networks of flow channels are connected between input and output manifolds, which generally extend right across the stack. Each manifold is encircled by a seal in order to prevent mixing of the various fluids flowing through the stack.

The plates are also electrically conductive in order to form collectors of the electrons generated at the anode. The plates also have the mechanical function (necessary to achieve a quality electrical contact) of transmitting stack clamping forces, and the function of mechanically supporting to the electrochemical core. Electronic conduction is achieved through the plates, ionic conduction being obtained through the membrane.

According to a first type of known design, a plate equipped with flow channels may be produced by machining a solid block in order to define these flow channels. The machined block is generally made of graphite.

According to a second type of known design, a set of plates is formed from two metal sheets that are joined by welding and that generally form therebetween flow channels for a coolant. The shape of the flow channels is then defined by forming or deforming the sheets, for example by stamping the metal sheets. Such a design is in general preferred as it decreases the cost and bulk of the plates while nonetheless maintaining a good level of performance.

The sheets used generally have a thickness comprised between 0.1 and 4 mm, depending on whether the channels are stamped or machined. Flow channels produced by stamping a sheet of typical thickness of 0.1 mm usually have a width comprised between 0.4 and 2 mm, for a depth comprised between 0.2 and 0.4 mm.

The design and production of sheet-metal cathode and anode plates are both complex and relatively expensive. This substantially impacts the cost price of the fuel-cell stack, as the plates thereof are together one of its most expensive components. In addition, the stamping operations result in loss of planarity, which complicates seal deposition. Moreover, the set of plates thus obtained is relatively heavy and bulky, this being particularly unwelcome in on-board fuel-cell-stack applications. Furthermore, the thin sheets used remain sufficiently flexible to allow the production of assemblies that are on the whole of nonplanar shape.

In order to avoid the constraints created by the stamping process, document CN107394228 proposes to deposit one or more layers of a carbon-containing ink on a planar metal sheet, so as to form ribs, flow channels being delineated between these ribs.

Such a manufacturing process takes a relatively long time and is complex to implement, it being necessary, to screen print a layer of ink, for the layer of ink deposited below to have already solidified. Such a process in particular requires a plurality of passes when the ratio between the height and width of a rib is higher than 0.5. No satisfactory way of producing a thick deposit in a single layer is described. Moreover, the control of the geometry of the ribs during drying is relatively poor. Furthermore, such ribs may have an insufficient conductivity and an insufficient mechanical strength.

Moreover, document US 2018/190998 describes a process for manufacturing a flow guide for an electrochemical reactor, comprising the steps of:
  providing a substrate;
  on a first face of the substrate, printing a layer of electrically conductive ink by applying a shear stress to this layer, the layer of ink being printed to form a pattern including ribs delineating flow channels. The inks used require the superposition of a plurality of layers to achieve ribs of large thicknesses.

Document US 2003/198860 describes the application of an electrode in the form of a paste having a non-Newtonian behaviour to a membrane or to a carrier gas-diffusion-layer. The problem here is that of applying, with a nozzle, the paste of right viscosity, i.e. of a viscosity such that the flow in this nozzle is not too fluid, and such that a good distribution of the paste over the carrier is achieved.

The invention aims to solve one or more of these drawbacks. The invention thus relates to a process for manufacturing a flow guide for an electrochemical reactor, comprising the steps of:

providing a substrate;

on a first face of the substrate, printing a layer of electrically conductive ink by applying a shear stress to this layer, the viscosity of the printed ink being comprised between 70 and 500 Pa·s for a shear rate (or shear gradient) of $0.1\ s^{-1}$, and the viscosity of the printed ink being comprised between 2.5 and 7 Pa·s for a shear rate of $100\ s^{-1}$, the layer of ink being printed to form a pattern including ribs delineating flow channels.

Unless otherwise indicated, the viscosity and shear-rate quantities will correspond to a temperature of 20° C.

The invention also relates to the following variants. Those skilled in the art will understand that each of the features of the following variants may be combined independently with the above features, without however forming an intermediate generalization.

According to one variant, the step of printing the layer of ink on the first face of the substrate is a screen-printing step.

According to another variant, said screen-printing step comprises depositing the ink on a stencil screen and applying a squeegee to the screen so as to apply a shear to the ink in order to print it onto the first face of the substrate.

According to another variant, the process furthermore comprises a drying step in order to solidify the layer of ink of the formed pattern.

According to another variant, said step of printing the layer of ink comprises applying a shear stress to this layer with a shear rate comprised between $10\ s^{-1}$ and $80\ s^{-1}$.

According to yet another variant, said printed layer of ink has a thickness at least equal to 150 μm.

According to one variant, the formed ribs have a height at least equal to half their width.

According to another variant, the solid content of said printed ink includes graphite particles in a proportion comprised between 90 and 99%.

According to another variant, the solid content represents between 50 and 75% by weight of the ink to which the shear is applied.

According to one variant, the solid graphite-mixture content of said ink includes particles having a D50 diameter comprised between 1 and 6 μm in a proportion comprised between 1 and 35% by weight, the solid graphite-mixture content of said ink furthermore including particles having a D50 diameter comprised between 10 and 25 μm in a proportion of at least 25% by weight.

According to yet another variant, said ink to which the shear is applied includes a polymer binder.

According to one variant, said ink to which the shear is applied includes polyvinylidene fluoride.

According to another variant, the ink to which the shear is applied has a storage modulus higher than the viscous modulus for a deformation amplitude of 1% at a frequency lower than 0.1 Hz.

According to another variant, the ink to which the shear is applied has a storage modulus lower than the viscous modulus for a deformation amplitude of 1% at a frequency higher than 2 Hz.

According to yet another variant, said provided substrate is exempt of relief level with the printed ink.

According to one variant, said provided substrate is an electrically conductive plate, a gas diffusion layer or an electrode layer.

The invention also relates to a process for manufacturing a bipolar plate, comprising manufacturing first to third flow guides using a manufacturing process such as defined above, said provided substrate being an electrically conductive plate for each of the first to third flow guides, a layer of electrically conductive ink being printed only on the first face of the first to third flow guides, a bipolar plate being formed by bonding second faces of the first and second flow guides and by bonding the ribs of the pattern formed on the second flow guide against a second face of the third flow guide, so as to delineate flow channels between the second and third flow guides.

According to one variant, said provided substrate is an electrically conductive plate, and a layer of electrically conductive ink is printed by applying a shear to this layer on a second face of said conductive plate, the viscosity of the printed ink being comprised between 70 and 500 Pa·s for a shear rate of $0.1\ s^{-1}$, and the viscosity of the printed ink being comprised between 2.5 and 7 Pa·s for a shear rate of $100\ s^{-1}$, the layer of ink being printed in order to form a pattern including ribs delineating flow channels.

In a process for manufacturing a bipolar plate, a flow guide may be produced using a manufacturing process such as defined above, and comprising applying a face of another electrically conductive plate against ribs of a pattern, which ribs are formed on the carrier of the flow guide.

The invention also relates to a process for manufacturing a fuel-cell stack, comprising:

forming a first flow guide using a manufacturing process such as defined above, wherein the substrate of the first guide is a first electrically conductive plate;

forming a second flow guide using a manufacturing process such as defined above, wherein the substrate of the second guide is a second electrically conductive plate;

placing a membrane/electrode assembly between said first and second plates, the respective ribs of the patterns formed on the first and second flow plates being oriented toward the membrane/electrode assembly.

According to one variant, each of said ribs of the formed patterns consists of a single printed layer of ink.

According to one variant, the plate is manufactured using a process as described above.

Other features and advantages of the invention will become more clearly apparent from the description that is given thereof below, by way of completely nonlimiting indication, and with reference to the appended drawings, in which:

FIG. 12 illustrates an example of a profile of ribs and flow channels produced using a manufacturing process according to the invention;

FIG. 13 illustrates a schematic cross-sectional view of an example of a configuration of a guiding plate according to a second embodiment;

FIG. 14 illustrates the association of the guiding plate of FIG. 13 with other components;

In must be understood that the use of the terms 'centre', 'upper', 'lower', 'front', 'rear', 'left', 'right', 'vertical', 'horizontal', 'top', 'bottom', 'interior' and 'exterior' to describe orientation or position refers to the orientation or position shown in the appended drawings. These terms are used to facilitate the comprehension of the description of the invention, rather than to indicate that an element described as having a particular position or orientation must necessarily be produced or implemented with this specific position or orientation.

Figure 1:
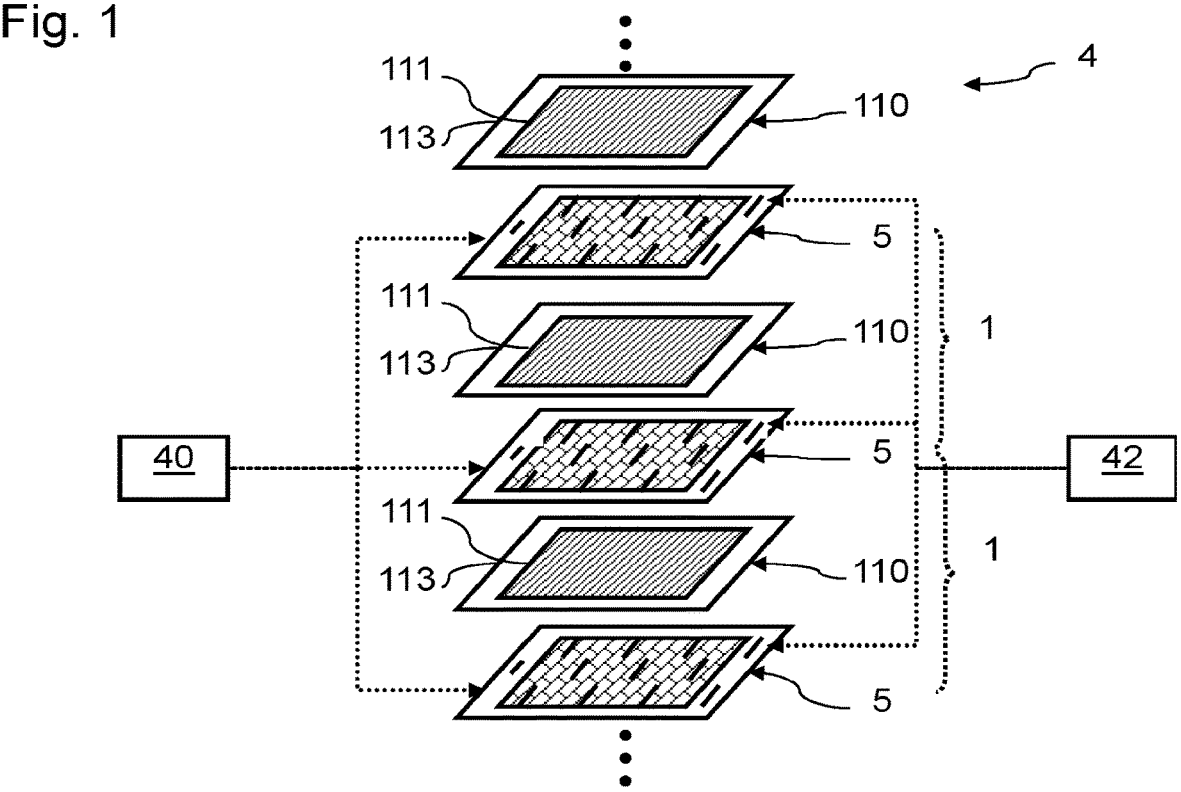
FIG. 1 is an exploded schematic perspective view of an example of a fuel-cell stack.

FIG. 1 is an exploded schematic perspective view of a stack of cells 1 of a fuel-cell 4. The fuel-cell 4 comprises a plurality of superposed cells 1 to form a stack. The cells 1 are proton-exchange-membrane or polymer-electrolyte-membrane cells. The invention will be described here with respect to the manufacture of a flow guide 40 for guiding reagents, products or heat-transfer media in a fuel-cell stack, but could equally well be used to manufacture flow guides for other types of electrochemical reactors, electrolysers for example.

The fuel-cell stack 4 comprises a fuel source 40. The fuel source 40 supplies, here with dihydrogen, an inlet of each cell 1. The fuel-cell stack 4 also comprises an oxidant source 42. The oxidant source 42 supplies, here with air, an inlet of each cell 1, the oxygen of the air being used as oxidant. Each cell 1 also comprises exhaust channels. One or more cells 1 also comprise a circuit for cooling the reactive zone.

Each cell 1 comprises a membrane/electrode assembly 110 or an MEA 110. A membrane/electrode assembly 110 comprises a solid electrolyte 113, a cathode (not illustrated) and an anode 111 that are placed on either side of the electrolyte and fastened to this electrolyte 113. The electrolyte layer 113 forms a semipermeable membrane allowing protonic conduction while being impermeable to the gases present in the cell. The electrolyte layer also prevents passage of electrons between the anode 111 and the cathode. The electrolyte 113 is for example made of polybenzimidazole (PBI) doped with phosphoric acid or made of a protonically conductive ionomer.

A set of anode and cathode plates 5 is placed between each pair of adjacent MEAs. In the example illustrated for this embodiment, on each side of an MEA, a set of plates 5 equipped with channels forms a reagent-flow guide. Each set of plates 5 here defines anode flow channels and cathode flow channels on its opposite external faces. Sets of flow plates 5 also advantageously define coolant-flow channels between two successive membrane/electrode assemblies. The sets of plates 5 may each be formed in a way known per se from two joined conductive metal sheets that are for example made of stainless steel, titanium alloy, aluminium alloy, nickel alloy or tantalum alloy. Each sheet then defines a respective external face. The sets of plates 5 may also be obtained by any other process, for example moulding or injection moulding from carbon-polymer composites. These sets of plates 5 may thus also be a one-piece part of integral construction. The external faces of the sets of plates 5 are then defined by such a one-piece part of integral construction. Each membrane/electrode assembly 110 may furthermore comprise one gas diffusion layer (not illustrated) placed between the anode and fuel-flow channels, and another gas diffusion layer placed between the cathode and other oxidant-flow channels. The membrane/electrode assemblies 110 may comprise reinforcements (not illustrated here). In this embodiment, the envisioned channels are produced on the plates.

As is known per se, during the operation of the fuel-cell stack 4, air flows between an MEA 110 and one set of plates 5, and dihydrogen flows between this MEA 110 and another set of plates 5. The function of the sets of plates 5 is in particular to guide the flow of reagents on either side of the MEA 110. At the anode, the dihydrogen is ionized in order to produce protons that pass through the MEA 110. The electrons produced by this reaction are collected by a set of plates 5. The produced electrons are then transferred to an electrical load connected to the fuel-cell stack 4 in order to form an electrical current. At the cathode, oxygen is reduced and reacts with the protons to form water.

During its operation, a cell 1 of the fuel-cell stack 4 usually generates, across the anode and the cathode, a DC voltage of between 0.5 and 1 V, depending on the gas-flow conditions.

The oxidant source 42 typically comprises a compressor in order to inject air at a given pressure into the inlet of the cells 1. Such a compressor for example receives an air-pressure setpoint, the air pressure possibly being regulated via a variable rotation speed of the compressor.

The stack of the sets of plates 5 and of the membrane/electrode assemblies 110 is intended to form a plurality of flow manifolds. To this end, respective orifices are produced through the sets of plates 5 and through the membrane/electrode assemblies 110. The orifices of the sets of plates 5 and of the membrane/electrode assemblies 110 are placed facing one another in order to form the various flow manifolds.

Figure 2:
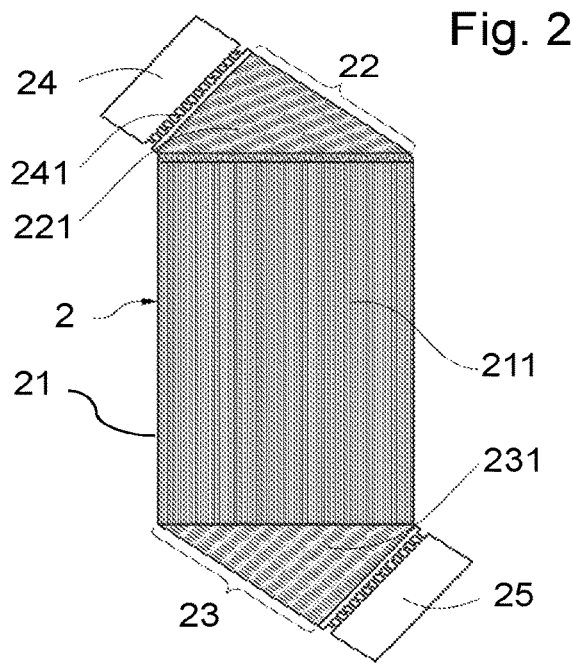
FIG. 2 is a top view of an example of a flow-guiding plate.

FIG. 2 is a top view of an example of a flow-guiding plate 2. FIG. 2 illustrates one face of the guiding plate 2, which is intended to guide a reagent to a reactive zone positioned in the middle portion thereof. The guiding plate 2 thus has a reactive zone 21 in its middle portion, comprising flow channels 211. The guiding plate 2 also comprises an inlet reagent manifold 24 and an outlet reagent manifold 25, which manifolds are positioned on either side of the reactive zone 21. A homogenization zone 22 is formed between the reactive zone 21 and the inlet manifold 24. The homogenization zone 22 here comprises homogenization channels 221. A linking zone 241, for example including injectors, is placed between the inlet manifold 24 and the homogenization zone 22. A homogenization zone 23 is formed between the reactive zone 21 and the outlet manifold 25. The homogenization zone 23 here comprises homogenization channels 231. A linking zone, for example including injectors, is formed between the outlet manifold 25 and the homogenization zone 23.

Figure 9:
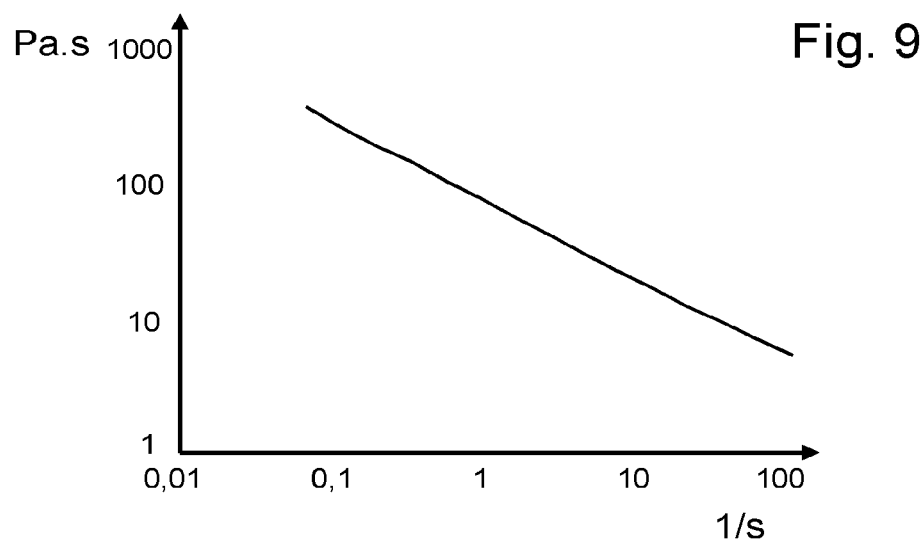
FIG. 9 is a graph illustrating the shear-thinning rheological behaviour of an example of an ink usable to implement a process according to the invention.

An example of a process for manufacturing a guiding plate 2 will now be described with reference to FIG. 3. Generally, the method for manufacturing a flow-guiding plate 2 for an electrochemical reactor comprises the following steps:
- providing a substrate (for example an electrically conductive plate, a gas diffusion layer or an electrode layer);
- on a first face of this substrate, printing a layer of ink or of electrically conductive paste, by applying thereto a sufficient shear rate (for example a shear rate comprised between 10 $s^{-1}$ and 80 $s^{-1}$). The viscosity of the ink to which the shear is applied is comprised between 70 and 500 Pa·s for a shear rate of 0.1 $s^{-1}$, and the viscosity of this printed ink is comprised between 2.5 and 7 Pa·s for a shear rate of 100 $s^{-1}$. FIG. 9 is a graph illustrating the rheological behaviour of an example of an ink usable for a printing operation in a manufacturing process according to the invention. The x-axis represents the shear rate applied to the ink, and the y-axis represents the viscosity of the ink. During the printing of the layer of ink, a shear stress is advantageously applied thereto with a shear rate comprised between 10 $s^{-1}$ and 80 $s^{-1}$. The graph was drawn using a rheometer of the type sold under the reference CVO by the company Malvern. On the whole, the deposited ink has shear-thinning properties, i.e. its viscosity decreases as the shear rate applied thereto increases. The layer of ink is printed in a pattern including ribs and delineating flow channels. The ribs may be continuous or discontinuous.

Such properties of the ink are suitable for obtaining the following behaviour during the implementation of the process:
- an ink that does not flow if the applied shear remains below the flow threshold during its deposition prior to the printing;
- an ink that flows during the application of a shear, allowing it to flow through a screen in order to be transferred in a pattern to the carrier;
- an ink that once again returns to a state in which it does not flow if the applied shear drops below a flow threshold after the transfer to the plate.

Such a manufacturing process allows relatively high ribs to be produced in a single printing step, with a well-controlled final geometry. Such a manufacturing process for example allows ribs defining the final height of the flow channels to be produced in a single printing step. In practice, an ink having such shear-thinning properties can be made to become very fluid during the application of the shear, in order to closely match the shape of the face of the conductive plate and follow the desired printing pattern, then once again very viscous after application of the shear is stopped, in order to preserve a satisfactory control of the geometry of the ribs formed during the printing. The risk of effects related to flow before the ribs formed are set are in particular limited.

Figure 3:
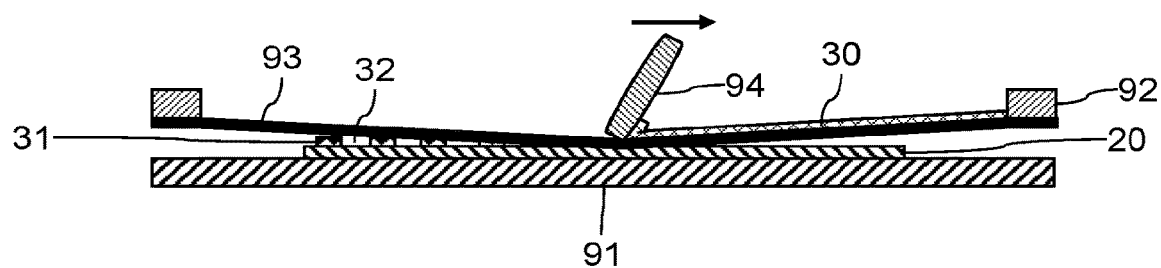
FIG. 3 is a schematic cross-sectional side view of a screen-printing step for forming a guiding plate according to the invention.

FIG. 3 illustrates a particular case of printing of a layer of conductive ink using a screen-printing process. The process is here illustrated in its application to the example of a conductive plate but could also be applied to a gas diffusion layer or to an electrode. FIG. 3 is a schematic cross-sectional side view of a screen-printing step for forming a guiding plate according to one embodiment of the invention. Screen printing is advantageous because it allows a high production rate, with for example a screen-printing rate comprised between 15 and 25 metres/minute for a rotary screen-printing technique.

An electrically conductive plate 20 is here positioned and held in position on a carrier 91, such as a conveyor tray. A frame 92 is positioned above the plate 20. A mask 93 is fastened to the frame 92 and extends across a central aperture of the 40 frame 92. The mask 93 is placed vertically in line with the plate 20 in this central aperture of the frame 92. The mask 93 may have a structure known per se allowing the screen-printing step to be implemented. The mask 93 may for example take the form of a mesh screen or take the form of a stencil screen. A stencil screen will possibly be preferred for the deposition of a larger amount or a larger thickness of ink 30. A layer of ink 30 having the shear-thinning properties described above is deposited on the mask 93, vertically in line with the plate 20. The deposited layer of ink 30 is then in a very viscous state and does not flow. A squeegee 94 is then pressed against the ink 30 so as to bring the mask 93 into contact with the plate 20. The squeegee 94 is then moved over the surface of the plate 20, in order to apply a shear stress to the ink 30. The shear rate applied by the squeegee 94 to the ink 30 may for example reach 50 $s^{-1}$. The application of the shear to the ink 30 fluidifies it, this allowing it to pass through the mask 93 so as to be transferred to the plate 20 in such a way as to reproduce the pattern of the mask. After the passage of the squeegee 94, the shear stress on the ink ceases, so that the ink transferred to the plate 20 once again becomes very viscous and does not flow, in order to preserve the pattern formed by the mask 93. The ink transferred to the plate 20 forms a pattern including ribs 31, delineating flow channels 32 therebetween. The ribs 31 in particular have lateral faces that extend in one dimension of the plate 20, in order to form the flow channels 32. The formed ribs 31 may be continuous or discontinuous, and optionally of the same dimension over the entire extent of the flow.

After the step of applying the squeegee 94, i.e. after the ink 30 has been transferred to form the ribs 31 on the plate 20, a step of drying the ink is advantageously carried out, in order to remove the solvent present in the ink 30. The drying may be achieved via natural evaporation or accelerated via artificial irradiation. Accelerated drying may promote better control of the geometry of the formed ribs 31. Accelerated drying may for example be carried out in a conveyor oven or in a static oven. A plurality of sheets may be dried simultaneously after they have been joined.

The ribs 31 may for example be calender rolled after drying, in order to limit defects in the planarity of the tops of the ribs, or in order to densify the structure thereof and increase the electronic conductivity thereof.

Generally, the formation of the ribs 31 on a plate 20 allows a particularly thin plate 20 to be used. A thin plate makes it possible both to increase the electrical power density generated for a fuel-cell stack 4 of given weight, and to decrease the manufacturing cost of the fuel-cell stack 4. A radius of curvature may be applied to the plate 20 in order to produce a fuel-cell stack 4 of nonplanar shape. In order to allow the plate 20 to flex and curve, the printing zone of the layer of ink is advantageously devoid of relief.

There are three main modes of reagent flow through the flow channels 32 of reactive zone:

- serpentine channels: one or more channels run through the whole of the active zone in a plurality of there-and-back trips.
- parallel channels: an array of parallel through-channels run right across the active zone.
- interdigitated channels: an array of parallel and blocked channels runs right across the active zone. Each channel is blocked either on the fluid inlet side, or on the fluid outlet side. The fluid entering into a channel is then required to pass through the gas diffusion layer locally in order to join an adjacent channel and then reach the fluid outlet of this adjacent channel.

The formed ribs 31 delineate flow channels 32 in order for example to allow one of the aforementioned reagent flow modes to be formed. The ribs 31 may also be formed in order to delineate flow channels in the homogenization zones.

The formulation of the deposited ink 30 to which the shear is applied is even more advantageously configured to achieve the following properties: an ink viscosity comprised between 200 and 400 Pa·s for a shear rate of $0.1$ $s^{-1}$, and an ink viscosity comprised between 4.5 and 6 Pa·s for a shear rate of 100 $s^{-1}$.

Figure 10:
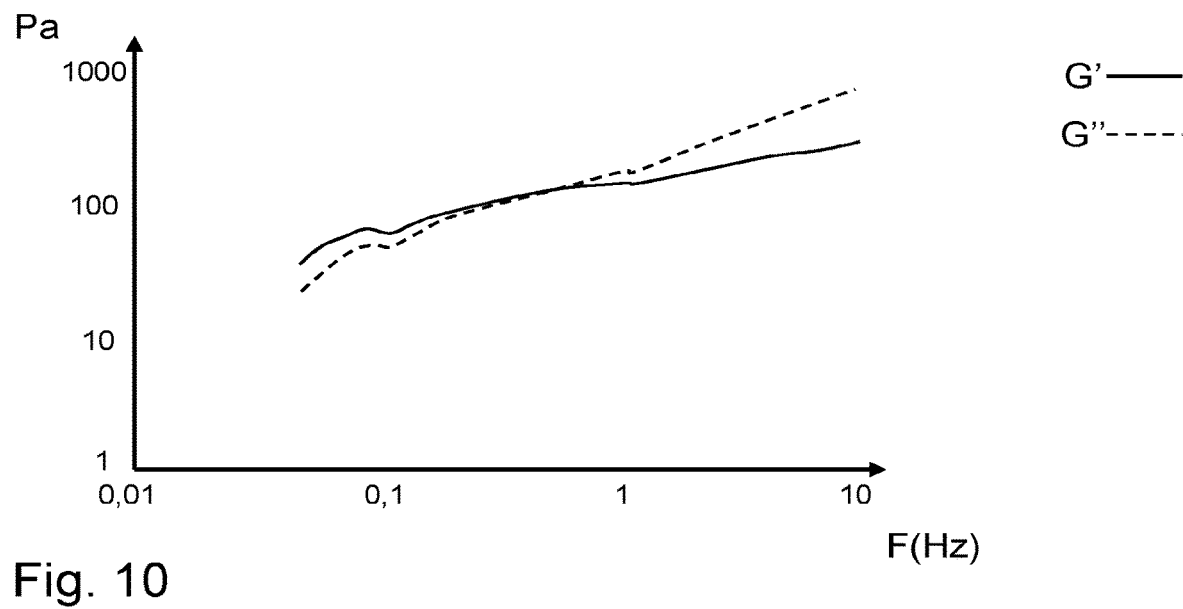
FIG. 10 is a graph illustrating another example of an advantageous rheological behaviour of an ink for the implementation of a process according to the invention.

The ink used may have other advantageous properties. An ink having the following properties in particular makes it possible to promote a good fluidity during the application of the shear, and a good stability after the formation of the ribs 31 in their pattern. In a test of the ink by measurement of oscillations with a frequency scan at a deformation amplitude of 1%, the ink advantageously has a storage modulus G' (or elastic modulus to use the more common term) higher than the loss modulus G" (or viscous modulus to use the more common term) at low frequencies, typically lower than 0.1 Hz. This property indicates that the ink is stable and does not flow at rest and that there is therefore little risk that it will sediment or flow. In the same test of the ink by oscillation measurement, this ink advantageously has a storage modulus G' lower than the loss modulus G" at higher frequencies, typically higher than 2 Hz. The graph of FIG. 10 illustrates the values G' and G" for an ink having such a behaviour, with deformation frequency on the x-axis and the value of the modulus on the y-axis. The values of the storage modulus G' and of the loss modulus G" are preferably comprised between 1 and 200 Pa, and more preferably comprised between 10 and 100 Pa, at a frequency of 0.1 Hz.

The ink 30 deposited, for example in the form of an electronically conductive paste, here includes a conductive material, a polymer binder and a solvent. The proportions of conductive material, binder and solvent allow the rheology of the ink 30 to be adjusted.

The conductive material of the ink 30 is for example graphite. The use of graphite is advantageous because of its hydrophobic properties, which make it suitable for use in a very wet environment, such as that of a fuel-cell stack. The solid content of graphite in the ink is for example higher than 50% by weight.

The graphite included in the ink 30 to be printed is for example natural or synthetic graphite, surface-modified graphite, or graphite of spherical shape or potato shape (or flakes). The graphite included in the ink 30 to be printed for example has a D50 particle-size distribution comprised between 1 and 30 μm, and more preferably a D50 particle-size distribution comprised between 3 and 15 μm.

The ink 30 advantageously includes graphite particles of at least two different sizes, in order to improve the mechanical strength and the conductivity of the ribs 31. The geometric dispersion of the formed ribs 31 (and therefore of the flow channels 32) is also low.

The solid graphite-mixture content of the ink 30 advantageously includes graphite particles having a D50 diameter comprised between 1 and 6 μm in a proportion comprised between 1 and 35% (and preferably between 15 and 27%, and advantageously of 25%) by weight, the solid graphite-mixture content of the ink 30 furthermore including graphite particles having a D50 diameter comprised between 10 and 25 μm in a proportion of at least 25% by weight.

The percentage of solid content in the ink 30 is preferably comprised between 50 and 75%, and more preferably comprised between 58 and 62%.

The solid mass of the solid content of the ink 30 advantageously includes a proportion by weight of graphite comprised between 90 and 99%, preferably the solid content of the ink 30 includes a proportion by weight of graphite comprised between 96 and 98%. With such proportions, little shrinkage of the ribs 31 during drying and an excellent geometric stability after printing are obtained.

Additives may be added to the ink in order to improve its electronic conductivity: for example electronic conductors such as carbon black, carbon fibres or carbon nanotubes or indeed metal fibres such as silver nanowires, copper nanowires or nanowires of any other conductive metal.

By way of polymer binder of the ink 30, it is for example possible to envision polyvinylidene fluoride (PVDF) or the derivatives thereof, polyvinyl acetate (PVA), polymethyl methacrylate (PMMA), polyoxyethylene (POE) or the derivatives thereof, polyethylene terephthalate (PET), the polyacrylics or the derivatives thereof, the polyimides or the derivatives thereof, the polyetheretherketones or the derivatives thereof, polyethersulfones or the derivatives thereof, polyolefins, polyethylene, celluloses such as, inter alia, carboxymethylcellulose or cellulose fibres, copolymers such as inter alia PVDF-HFP (hexafluoropropylene) or PVDF-POE, acrylic latexes or latexes of the SBR type (SBR standing for styrene butadiene rubber) or NBR type (NBR standing for nitrile butadiene rubber).

Preferably, the polymer binder of the ink 30 used is PVDF. Specifically, it is insoluble in water, this being a great advantage for fuel-cell-stack operation, as in fuel-cell stacks water is produced in large amounts. In addition, PVDF is hydrophobic and therefore contributes to the removal of the generated water from the fuel-cell stack with a view to clearing the flow channels of the reactive zone.

The percentage of solvent is preferably comprised between 30 and 50% of the total weight of the ink 30, and more favourably comprised between 38 and 42% of the total weight of the ink 30.

As solvent of the ink, it is for example possible to use N-methyl-2-pyrrolidone (NMP) or the derivatives thereof, cyclic ethers such as dioxane or tetrahydrofuran (THF), N,N-dimethylformamide (DMF), N,N-dimethylacetamide (DMAc), dimethyl sulfoxide (DMSO), meta-cresol, ketones such as acetone, methyl ethyl ketone (MEK) or the derivatives thereof, water or aqueous bases. Preferably, NMP will be used because it is a very good solvent of PVDF.

Other additives may be used to homogenize the ink (also known as colloidal suspension) such as surfactants, dispersants or deflocculants.

The plate 20 may for example be made of metal covered with carbon or of a composite filled with metal fillers. The plate 20 may for example include stainless steel, aluminium or titanium. The metal may for example be protected by a metal- or carbon-containing deposit or by an electronically conductive composite polymer including a metal-containing layer, in order to protect the plate 20 from corrosion or decrease contact resistance. The plate 20 may be flexible or rigid and preferably have a thickness comprised between 0.01 and 1 mm, and more preferably comprised between 0.02 and 0.1 mm.

The manufacturing process is particularly suitable for forming ribs 31 of a height at least equal to 120 µm, or even of a height at least equal to 200 µm, or even of at least 250 µm, from a single printed layer of ink. The height of the ribs 31 formed from a single printed layer of ink will possibly for example be comprised between 140 and 200 µm. The invention is particularly advantageous for forming ribs 31 of a height at least equal to half their width, and even more advantageous when their height is at least equal to their width. The spacing between the ribs 31, which defines the width of the flow channels 32, for example has a value comprised between 200 and 400 µm, and preferably between 250 and 300 µm (spacing measured halfway up the ribs 31).

Figure 11:
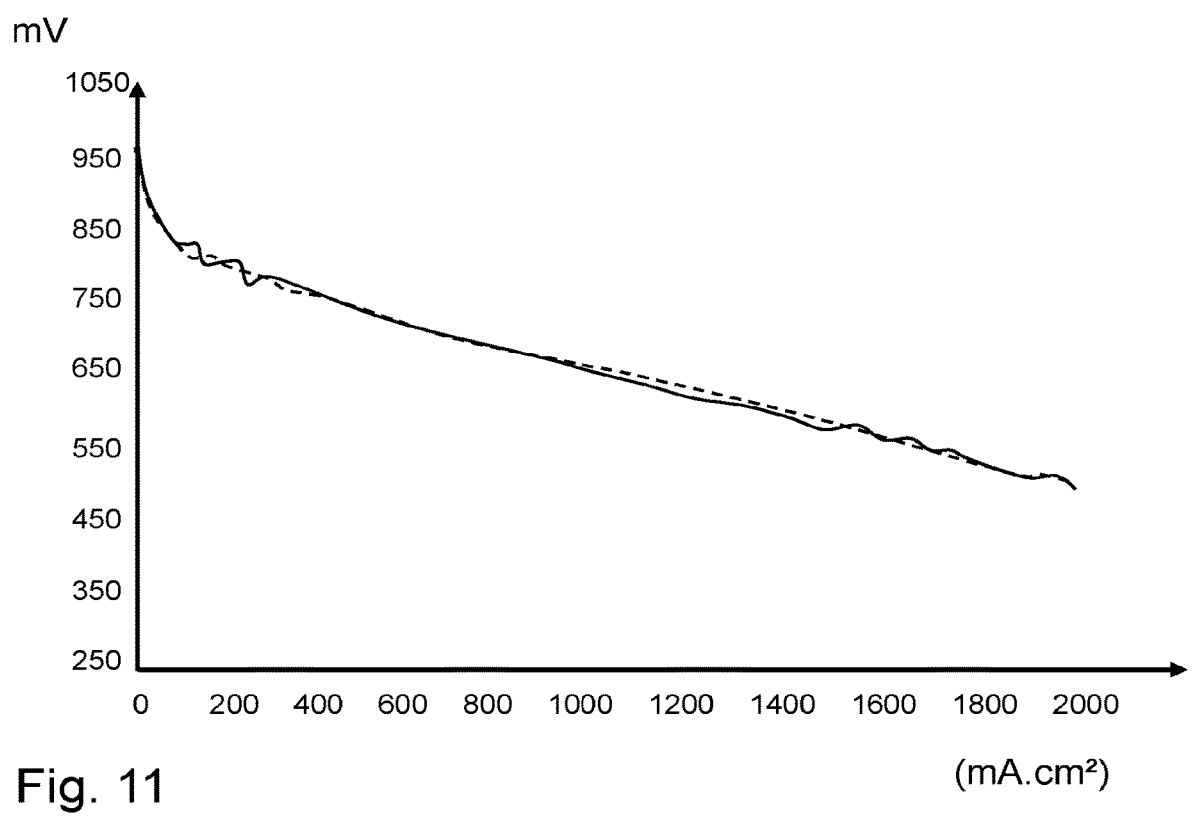
FIG. 11 illustrates, for comparison, bias curves for a fuel-cell stack including flow-guiding plates according to the invention and a fuel-cell stack including flow-guiding plates according to the prior art.

FIG. 11 illustrates, for comparison, bias curves of a fuel-cell stack including flow-guiding plates produced using the manufacturing process of the invention and of a fuel-cell stack including flow-guiding plates produced by machining a graphite block. The very great similarity of the performance of these fuel-cell stacks may be seen, this demonstrating that a flow-guiding plate manufactured using a process according to the invention does not degrade the operation of the fuel-cell stack.

FIG. 12 illustrates an example of the measured profile of the ribs 31 and homogenization channels 32 of a flow-guiding plate 2, which plate was produced using a manufacturing process according to the invention. The ribs 31 thus obtained have a quite uniform structure and have a low geometric dispersion with respect to one another. The low dispersion between the heights of the various ribs 31 may in particular be noted. The following are the parameters of the process that allowed such ribs to be formed: a screen-printing machine of the type sold by the company DEK under the model reference 248 was used. A flat plate 20 made of stainless steel coated with gold of a thickness of 0.05 mm was used. A stencil screen of 24 inches by 24 inches made of stainless steel and fastened by a web to the ends of the frame was used. The printing pattern was composed of apertures of 0.4 mm width and 50 mm length, which apertures were spaced apart by 0.4 mm in the width direction. The stencil screen used had a thickness of 0.2 mm. The shear was applied at a speed of 50 mm/s using a force of 4 kg. The printed pattern was then dried for one hour at a temperature of 80° C. in a ventilated oven. The ink used comprised 56.6% by weight of a mixture of graphite particles having two different diameters (75% graphite having a D50 diameter of 13 µm, 25% graphite having a D50 diameter of 4 µm), 2.4% by weight PVDF, and 41% by weight NMP.

Figure 4:
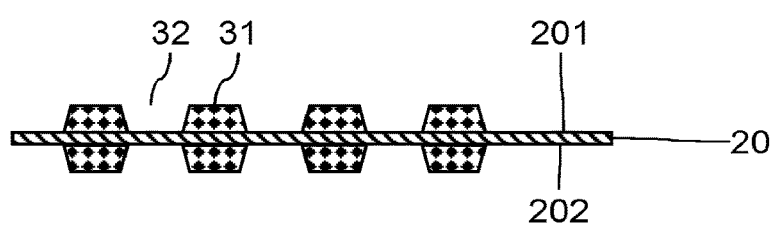
FIG. 4 is a schematic cross-sectional view of an example of a configuration of a guiding plate according to a first embodiment.
Figure 5:
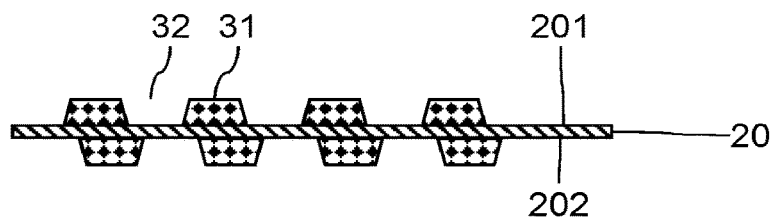
FIG. 5 is a schematic cross-sectional view of an another example of a configuration of a guiding plate.
Figure 6:
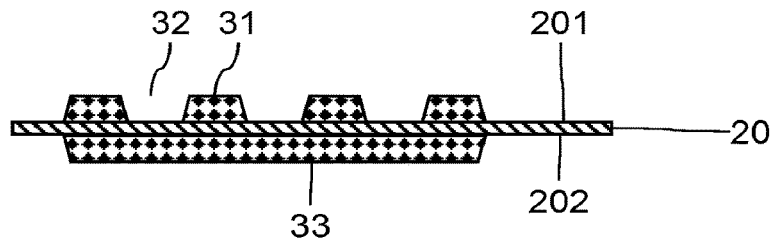
FIG. 6 is a schematic cross-sectional view of another example of a configuration of a guiding plate for two crossed adjacent streams.

The manufacturing process may be applied to an opposite face of the plate 20, with the same ink and printing parameters. FIGS. 4 to 6 illustrate (schematic cross-sectional views) various configurations of guiding plates 2, for which ribs have been formed by printing on two opposite faces.

In the example of FIG. 4, ribs 31 are formed on an upper face 201 of the plate 20 and other ribs 31 are formed on a lower face 202 of the plate 20. Flow channels 32 are formed between the ribs 31. In this example, the ribs 31 of the two opposite faces extend in parallel. In this example, the ribs of the two faces 201 and 202 have the same dimensions and are superposed: the ribs of the two faces are symmetric to each other with respect to the plate 20.

In the example of FIG. 5, ribs 31 are formed on an upper face 201 of the plate 20 and other ribs 31 are formed on a lower face 202 of the plate 20. Flow channels 32 are formed between the ribs 31. In this example, the ribs 31 of the two opposite faces extend in parallel, in a longitudinal direction. In this example, the ribs of the two faces 201 and 202 have the same dimensions and are offset in a transverse direction.

In the example of FIG. 6, ribs 31 are formed on an upper face 201 of the plate 20 and other ribs 33 are formed on a lower face 202 of the plate 20. Flow channels 32 are formed between the ribs 31. Flow channels (not illustrated) are also formed between the ribs 33. In this example, the ribs 31 and the ribs 33 extend in perpendicular directions.

Figure 7:
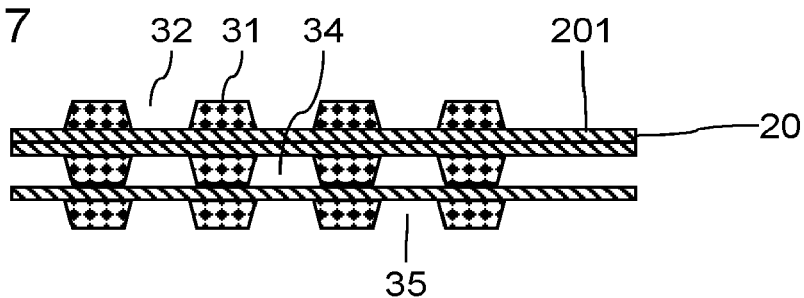
FIG. 7 is a schematic cross-sectional view of an example of an association of guiding plates to form a bipolar plate.

FIG. 7 illustrates a bipolar plate, formed by superposing flow-guiding plates obtained using a manufacturing process according to the invention. In this example, three flow-guiding plates are superposed. These three flow-guiding plates comprise ribs 31 on a single face. The upper guiding plate has ribs 31 that protrude from its upper face. The intermediate guiding plate and the lower guiding plate have ribs 31 that protrude from their lower face. When these three guiding plates are superposed, flow channels 32 for one reagent are formed between the ribs of the upper plate, flow channels 34 for a coolant are formed between the ribs of the intermediate guiding plate, and flow channels 35 for another reagent are formed between the ribs of the lower plate.

Figure 8:
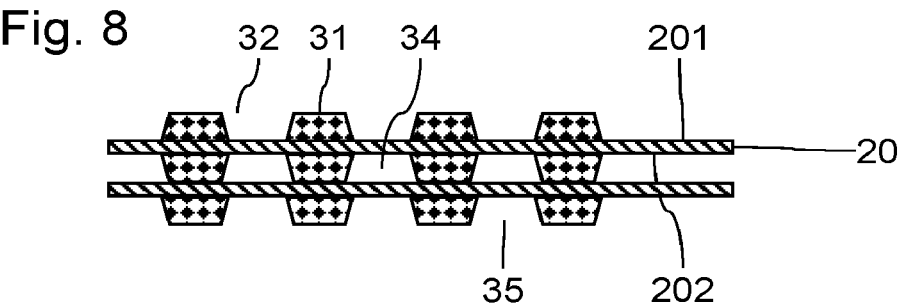
FIG. 8 is a schematic cross-sectional view of another example of an association of guiding plates to form a bipolar plate.

FIG. 8 illustrates a bipolar plate formed by superposing flow-guiding plates obtained using a manufacturing process according to the invention. In this example, two flow-guiding plates are superposed. The upper guiding plate corresponds to the configuration illustrated in FIG. 4. This guiding plate therefore comprises ribs 31 protruding from both its faces. The lower flow-guiding plate comprises ribs 31 protruding from a single face. The lower guiding plate has ribs 31 protruding from its lower face. When these two guiding plates are superposed, flow channels 32 for one reagent are formed between the upper ribs of the upper plate, flow channels 34 for a coolant are formed between the lower ribs of this upper guiding plate, and flow channels 35 for another reagent are formed between the ribs of the lower plate.

FIG. 13 is a schematic cross-sectional view of a guiding plate according to a second embodiment of the invention. The substrate on which the layer of conductive ink is screen printed is here a gas diffusion layer 60. The ink may be printed on one face 601 of the gas diffusion layer 60, with parameters similar to those described for the first embodiment. The printing then forms ribs 31 that delineate flow channels 32 therebetween.

FIG. 14 is a schematic cross-sectional view of such a guiding plate, associated with other components of an electrochemical reactor. A planar conductive plate 20, such as that described in the first embodiment, may be pressed against the tops of the ribs 31. A membrane-electrode assembly, including a membrane 113, an anode 111 and a cathode 112, is pressed against one face 602 of the gas diffusion layer.

Figure 15:
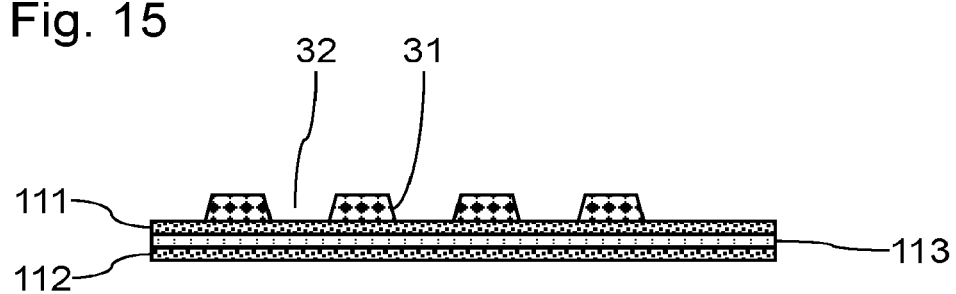
FIG. 15 illustrates a schematic cross-sectional view of an example of a configuration of a guiding plate according to a third embodiment.

FIG. 15 is a schematic cross-sectional view of a guiding plate according to a third embodiment of the invention. The substrate on which the layer of conductive ink is screen printed is here an electrode 111. The electrode 111 is in the present case an anode but the printing could also be carried out on a cathode. In this example, the printing is carried out on an electrode 111 that has been secured beforehand to a proton exchange membrane 113 of a membrane-electrode assembly. The printing could also be carried out on an electrode 111 not secured to a membrane. The ink may be printed on one face of the electrode 111, with parameters similar to those described for the first embodiment. The printing then forms ribs 31 that delineate flow channels 32 therebetween.

Figure 16:
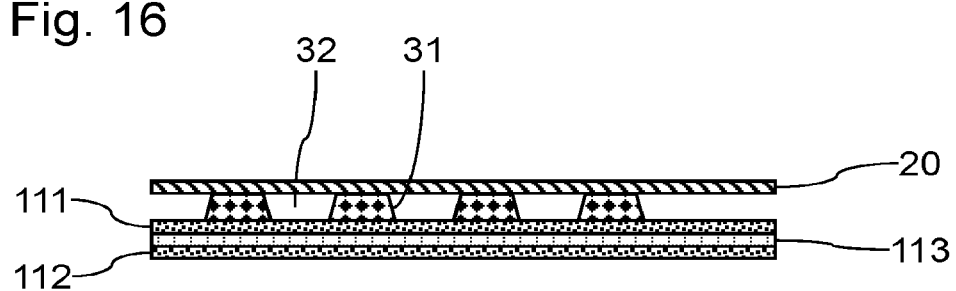
FIG. 16 illustrates the association of the guiding plate of FIG. 15 with other components.

FIG. 16 is a schematic cross-sectional view of such a guiding plate, associated with other components of an electrochemical reactor. A planar conductive plate 20, such as that described in the first embodiment, may be pressed against the tops of the ribs 31.

The invention claimed is:

1. A process for manufacturing a flow guide for an electrochemical reactor, comprising:
on a first face of a substrate, printing a layer of electrically conductive ink by applying a shear stress to the layer, a viscosity of a printed said electrically conductive ink being comprised between 70 and 500 Pa·s for a shear rate of 0.1 s$^{-1}$, and a viscosity of the printed electrically conductive ink being comprised between 2.5 and 7 Pa·s for a shear rate of 100 s$^{-1}$, the layer of electrically conductive ink being printed to form a pattern including ribs delineating flow channels.

2. The manufacturing process according to claim 1, wherein the printing the is a screen-printing.

3. The manufacturing process according to claim 2, wherein said screen-printing comprises depositing the electrically conductive ink on a stencil screen and applying a squeegee to the stencil screen so as to apply the shear stress to the electrically conductive ink in order to print it onto the first face of the substrate.

4. The manufacturing process according to claim 1, further comprising drying in order to solidify the layer of electrically conductive ink of the formed pattern.

5. The manufacturing process according to claim 1, wherein said printing comprises applying the shear stress to the layer with a shear rate comprised between 10 s$^{-1}$ and 80 s$^{-1}$.

6. The manufacturing process according to claim 1, wherein said printed layer of electrically conductive ink has a thickness at least equal to 150 μm.

7. The manufacturing process according to claim 1, wherein the ribs have a height at least equal to half of a width of the ribs.

8. The manufacturing process according to claim 1, wherein a solid content of said printed electrically conductive ink includes graphite particles in a proportion comprised between 90 and 99%.

9. The manufacturing process according to claim 1, wherein a solid content of said printed electrically conductive ink represents between 50 and 75% by weight of the electrically conductive ink to which the shear stress is applied.

10. The manufacturing process according to claim 1, wherein a solid graphite-mixture content of said electrically conductive ink includes particles having a D50 diameter comprised between 1 and 6 μm in a proportion comprised between 1 and 35% by weight, the solid graphite-mixture content of said electrically conductive ink furthermore including particles having a D50 diameter comprised between 10 and 25 μm in a proportion of at least 25% by weight.

11. The manufacturing process according to claim 1, wherein said electrically conductive ink to which the shear stress is applied includes a polymer binder.

12. The manufacturing process according to claim 11, wherein said electrically conductive ink to which the shear stress is applied includes polyvinylidene fluoride.

13. The manufacturing process according to claim 1, wherein the electrically conductive ink to which the shear stress is applied has a storage modulus higher than a viscous modulus for a deformation amplitude of 1% at a frequency lower than 0.1 Hz.

14. The manufacturing process according to claim 1, wherein the electrically conductive ink to which the shear stress is applied has a storage modulus lower than a viscous modulus for a deformation amplitude of 1% at a frequency higher than 2 Hz.

15. The manufacturing process according to claim 1, wherein said substrate is exempt of relief level with the printed electrically conductive ink.

16. The manufacturing process according to claim 1, wherein said substrate is an electrically conductive plate, a gas diffusion layer, or an electrode layer.

17. A process for manufacturing a bipolar plate, comprising manufacturing first to third flow guides using the manufacturing process according to claim 1, said substrate being an electrically conductive plate for each of the first to third flow guides, a layer of electrically conductive ink being printed only on the first face of the first to third flow guides, a bipolar plate being formed by bonding second faces of the first and second flow guides and by bonding the ribs of the pattern formed on the second flow guide against a second face of the third flow guide, so as to delineate flow channels between the second and third flow guides.

18. The manufacturing process according to claim 1, wherein
said substrate is an electrically conductive plate, and
the layer of electrically conductive ink is printed by applying the shear stress to the layer on a second face of said electrically conductive plate.

19. A process for manufacturing a bipolar plate, comprising:
manufacturing a flow guide using the manufacturing process according to claim 8; and
applying a face of another electrically conductive plate against the ribs of the pattern, the pattern being formed on a carrier of the flow guide.

20. A process for manufacturing a fuel-cell stack, comprising: forming a first flow guide using the manufacturing process according to claim 1, wherein the substrate of the first flow guide is a first electrically conductive plate;
forming a second flow guide using a manufacturing process, wherein a substrate of the second flow guide is a second electrically conductive plate; and
placing a membrane/electrode assembly between said first and second electrically conductive plates, respective ribs of the patterns formed on the first and second flow plates being oriented toward the membrane/electrode assembly.

21. The process for manufacturing a flow guide according to claim 1, wherein each of ribs of formed patterns consists of a single printed layer of ink.

22. A flow-guiding electrochemical-reactor plate, wherein it is manufactured using the manufacturing process according to claim 1.

* * * * *

UNITED STATES PATENT AND TRADEMARK OFFICE
CERTIFICATE OF CORRECTION

| | |
|---|---|
| PATENT NO. | : 11,437,638 B2 |
| APPLICATION NO. | : 16/567108 |
| DATED | : September 6, 2022 |
| INVENTOR(S) | : Jeremie Salomon et al. |

It is certified that error appears in the above-identified patent and that said Letters Patent is hereby corrected as shown below:

In the Claims

In Column 14, Claim 19, Line 42, delete "8;" and insert -- 18; --, therefor.

Signed and Sealed this
Sixteenth Day of May, 2023

*Katherine Kelly Vidal*

Katherine Kelly Vidal
*Director of the United States Patent and Trademark Office*